(12) United States Patent
Armin et al.

(10) Patent No.: US 6,214,159 B1
(45) Date of Patent: Apr. 10, 2001

(54) CURABLE EPOXIDE COMPOSITION AND ITS USE

(75) Inventors: Pfeil Armin, Kaufering; Dierker Sascha, Bobingen, both of (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/357,439

(22) Filed: Jul. 20, 1999

(30) Foreign Application Priority Data

Jul. 21, 1998 (DE) .............................. 198 32 669

(51) Int. Cl.$^7$ .................................. C09J 201/04
(52) U.S. Cl. .................. 156/330; 405/259.5; 523/457
(58) Field of Search ................ 523/457; 405/259.5; 156/330

(56) References Cited

U.S. PATENT DOCUMENTS 5,397,202 * 3/1995 Shrader et al. .................... 405/259
5,852,094 * 12/1998 Noomen et al. .................... 524/433

FOREIGN PATENT DOCUMENTS

| 3617702 | 12/1987 | (DE) . |
| 0454271 | 10/1991 | (EP) . |
| 454271 | * 10/1991 | (EP) . |
| 1036574 | 7/1966 | (GB) . |

* cited by examiner

*Primary Examiner*—Robert Dawson
*Assistant Examiner*—D. Aylward
(74) *Attorney, Agent, or Firm*—Brown & Wood, LLP

(57) ABSTRACT

The curable epoxide composition, suitable especially for fastening anchoring means in boreholes, contains polyepoxide, polyamine, polyacetoacetate, a metal compound as well as, optionally, further constituents. As further constituents, filler, diluents, curing catalysts, rheological aids, wetting agents, dyes and pigments, and the like come into consideration.

7 Claims, No Drawings

CURABLE EPOXIDE COMPOSITION AND ITS USE

BACKGROUND INFORMATION AND PRIOR ART

It is well known that cold-curing epoxide resins cure relatively slowly at temperatures below room temperature. Aside from highly reactive amine curing agents, the attempt has already been made to increase the reactivity of the system by appropriately high amounts of catalysts, for example, by the use of compounds, such as phenols, mercaptans and the like, which are, however, poisonous. The reactive diluents, usually used to reduce the high viscosity of the liquid epoxide resins, generally have little influence on the curing rate. On the other hand, however, they frequently lead to a cured resin with inferior mechanical properties, particularly, when they are used in amounts of 25% and more.

OBJECT OF THE INVENTION

From U.S. Pat. No. 5,021,537, it is known that the curing of epoxide resins can be accelerated with certain reactive diluents, particularly with acetoacetates themselves, even in small amounts. It is an object of the present invention to improve these known epoxide compositions, especially in the sense of increasing the curing rate, improving the flow behavior and the curing throughout, especially also at low temperatures below 0° C. Further objectives arise out of the advantages put forward. This objective is accomplished by curable epoxide compositions containing a) polyepoxide, b) polyamine, c) polyacetoacetate, d) a metal compound, mainly compounds of a metal cation and optionally further constituents, such as fillers, diluents, curing catalysts, rheological aids, wetting agents, dyes and pigments and the like.

The polyepoxides can be saturated, unsaturated, aliphatic, cycloaliphatic, aromatic or heterocyclic and optionally substituted by substituents, which do not have an interfering effect on the curing reaction, such as chlorine, bromine, alkyl or aryl. In particular, polyglycidyl ethers of multihydric alcohols and phenols, such as those of alkylene glycols, such as ethylene glycol and glycerin, but particularly polyglycidyl ethers of multihydric phenols, namely bisphenol A, bisphenol F and/or novolak are preferred. The epoxide equivalent weights of such compounds preferably range from about 150 to 2,000 and preferably from about 170 to 400. Suitable polyepoxide compounds are described, for example, in Lee, Neville, Handbook of Epoxy Resins 1967.

As curing agents, particularly aliphatic, cycloaliphatic and/or aromatic amines and polyamines, such as alkylenediamines like ethylenediamine, propylenediamine, hexamethylenediamine have proven their value. The highly reactive Mannich bases, especially the nontoxic condensation products without residual contents of phenols, obtained by the condensation of polyamines, such polyalkylenepolyamines, with aldehydes, such as formaldehyde, and monohydric or multihydric phenols, are preferred. As polyacetoacetate compound, preferably compounds with 2 to 5 acetoacetate groups, especially bisacetoacetates of dihydric aliphatic alcohols, such as ethylene glycol, or also triacetoacetates, for example, of trihydric aliphatic alcohols, such as glycerin, and tetraacetoacetates of multihydric alcohols are used. Triacetoacetates of trimethylol alkanes, such as trimethylolpropane or trimethylolethane, are preferred.

As metal compounds, polyvalent, preferably divalent cations, or chelate-forming cations come into consideration. Suitable cations originate basically from the first six main groups as well as from their subgroup of the periodic system (according to Meyer and Mendeleev) as well as from the $7^{th}$ and $8^{th}$ subgroups, such as magnesium, calcium zinc, cadmium, cobalt, nickel, manganese, tin, lead, mercury, vanadium, cerium, aluminum, iron, chromium and titanium. Especially preferred are those, which are relevant ecologically and economically, such as magnesium, calcium zinc, aluminum and iron. The metal compound usually is present in the form of its organic or inorganic salts or oxides, especially in, for example, a finely particulate form, which readily releases the metal ions. Calcium oxide and magnesium oxide particularly have proven to be suitable.

Useful fillers, when contained, are, for example, quartz, silicates, aluminosilicates, corundum, ceramic, glass, carbonates, such as chalk, kaolin, organic or inorganic fibers or the like. The inventive epoxide compositions can furthermore contain conventional constituents, such as inert organic solvents, like alcohols, esters, especially glycol ether or glycol ester and the like, curing catalysts, such as triethylamine, rheology aids, wetting agents, etc.

Per 100 parts by weight of epoxide and acetoacetate, polyamine may be contained in an amount of the order of 20 to 80 parts by weight and preferably of 25 to 50 parts by weight. The amount of amines should be sufficient with respect to the epoxide itself so that 0.8 to 3 amine hydrogens are available per epoxide group. Some consumption of the amine by the acetoacetate is not excluded. An excess of amine, for example, above the amine hydrogens required stoichiometrically for curing the epoxide and above that required so that there is one amino group per acetoacetate group, is preferred. The polyacetoacetates generally are contained in an amount of up to 35% by weight, based on the total amount of epoxide and polyacetoacetate, higher amounts not being excluded. Amounts between 2 and 25% by weight of polyacetate, relative to the total weight of epoxide and polyacetoacetate, are preferred. A portion of the polyacetoacetate can be replaced by subordinate amounts of other reactive diluents, such as $C_{10}$ to $C_{18}$ glycidyl ethers, t-butyl phenyl glycidyl ethers and the like. The concentration of the cationic metal can be defined, for example, stoichiometrically. For example, 0.20 moles of metal compound or more may be contained per acetoacetate equivalent, 0.25 to 1 mole of metal compound per acetoacetate group being preferred. However, higher or lower amounts, such as 0.1 mole, are not excluded.

The inventive polyepoxide compositions can be manufactured as two-component systems, in which epoxide resin and curing agent are separated from one another. The one component usually contains the polyepoxide and the polyacetoacetate compound, while the other component contains the curing agent, optionally a curing catalyst and the metal compound. The filler, as well as the other two constituents, may be contained in the one or the other component and optionally also in both components.

For epoxide resins, the inventive compositions have an atypically low viscosity, clearly accelerated initial curing, good curing and thorough curing properties, good flow behavior and a high reaction rate, particularly also at low temperatures, such as −5° C. or lower, very good adhesion and little shrinkage. The reactivity toward mineral borehole walls is noteworthy; evidently, it is a reaction caused by metal compounds, such as calcium ions, which can, under certain circumstances, partially replace the presence of the cations in the inventive compositions. The inventive compositions are very suitable for use in construction generally, for example, for fastenings, anchorages, crack repairs, gluing and the like.

The inventive epoxide compositions have proven their value particularly for fastening anchoring means in boreholes, as well as in natural and artificial rocks. Compared to comparable epoxide compositions, they reach 85% of their final strength soon.

The following example is intended to explain the invention:

| | |
|---|---|
| Basic bisphenol A/F - epoxide liquid resin with an epoxide equivalent weight of 183 g/equiv. (EP 116 of Hoechst | 37.1% |
| AATMP trimethylolpropane-triacetoacetate | 12.2% |
| Mannich base with an amine hydrogen equivalent of approximately 75 g/equiv. (VEH 2626 of Hoechst) | 13.2% |
| Filler 1: quartz sand with an average particle size of 0.24 mm | 11.0% |
| Filler 2: finely ground quartz with a specific BET surface area of 0.9 m$^2$/g | 21.7% |
| Alkaline earth oxide: CaO (98%) with a specific BET surface area of 5 to 10 m$^2$/g | |
| Pyrogenic silica | 2.0% |

Comparison Experiment of an Acetoacetate Epoxide Composition Contained as Glass Cartridge Compound Anchor with and without a Metal Compound:
1. Materials
   Resin Component
   Mixture of 75 parts by weight of Beckopox EP 116 (liquid epoxide resin with an epoxide equivalent weight of 185, based on bisphenol A/F) and 25 parts by weight of trimethylolpropane and trisacetoacetate.
   Curing Agent
   Beckopox special curing agent VEH 2626 (styrene-free Mannich base with an amine hydrogen equivalent weight of 73 mg KOH/g), which contains 1% by weight of triethylamine.
   Outer Pipe
   Length 100 mm, diameter 12.7 mm
   Inner Pipe
   Length 100 mm, diameter 9.25 mm
2. Preparation of the Compound Cartridge
   Connection without a Metal Cation
   Into the inner pipe, 6.0 g of quartz sand and 1.8 g of curing agent are introduced. The outer pipe is filled with 4.2 g of the resin mixture and the inner pipe is added.
   Connection with a Metal Cation (CaO)
   Into the inner pipe, 5.7 g of quartz sand, 0.4 g of CaO and 1.9 g of curing agent are introduced. The outer pipe is filled with 4.2 g of the resin mixture and the inner pipe is added.
3. Setting Experiment
   The compound cartridges are introduced into boreholes with a diameter of 14 mm in high strength concrete. A 12 mm tie bar with a roof-shaped cutting edge is inserted with impact torsion into the borehole. Due to the setting process, the small glass pipes are destroyed and the components mixed, the ground glass being incorporated as filler into the reaction resin composition. At various intervals of time, the tie bars are pulled out with force-measuring pull-out equipment and the course of the curing is determined by the failure load.

4. Evaluation and Interpretation

| Curing Time | Failure Load in kN without CaO | Failure Load in kN with CaO |
|---|---|---|
| 1 hour | 4.8 | 7.7 |
| 2 hours | 58.9 | 82.6 |
| 6 hours | 97.0 | 95.6 |
| 24 hours | 101.7 | 101.4 |

It can be seen clearly that the metal cation accelerates the curing appreciably already after 1 hour and especially after 2 hours. Already after 2 hours, these tie bars can be placed under load, whereas this is the case appreciably later for the tie bars without a metal cation. The presence of the metal cation does not have a harmful effect on the final performance of the system.

What is claimed is:
1. Curable epoxide composition containing:
   (a) polyepoxide
   (b) ployamine
   (c) ployacetoacetate
   (d) metal compound, mainly a compound of metal cation
   (e) alkaline earth oxides, preferably calcium oxide and/or magnesium oxide
and optionally further components, such as fillers, diluents, curing catalysts, rheology aids, wetting agents, dyes and pigments.
2. A method for fastening anchoring elements, such as tie bars or dowels, in boreholes, wherein a curable epoxide composition of claim 1 is placed in the borehole and the anchoring element is inserted therein.
3. A method for fastening anchoring elements, such as tie bars or dowels, in boreholes, wherein a curable epoxide composition containing
   (a) polyepoxide
   (b) polyamine
   (c) polyacetoacetate
   (d) metal compound, mainly a compound of metal cation and optionally further components, such as fillers, diluents, curing catalysts, rheology aids, wetting agents, dies and pigments is placed in the borehole and the anchoring element is inserted therein.
4. The method of claim 3, where the composition contains polyglycidyl ethers of multihydric phenols as the polyepoxide.
5. The method of claims 3 or 4, charaterized by polyglydicyl ethers, especially the digglyucidyl ether of bisphenol A, bisphenol F and/or novolak.
6. The method of claim 3, where the composition contains bis-, tri and/or tetraaceroacetate compound, especially triacetotrimethylolpropane and/or trimethylolethanetriacetoacetate as the polyacetoacetate.
7. The method of claim 3, where the epoxide further contains alkaline earth oxides, preferably calcium oxide and/or magnesium oxide.

* * * * *

UNITED STATES PATENT AND TRADEMARK OFFICE
CERTIFICATE OF CORRECTION

PATENT NO. : 6,214,159 B1
DATED : April 10, 2001
INVENTOR(S) : Armin Pfeil et al.

Page 1 of 1

It is certified that error appears in the above-identified patent and that said Letters Patent is hereby corrected as shown below:

<u>Title page,</u>
Item [75], should read -- Armin Pfeil, Kaufering; Dierker Sascha, Bobingen, both (DE) --

Signed and Sealed this

Second Day of April, 2002

*Attest:*

*Attesting Officer*

JAMES E. ROGAN
*Director of the United States Patent and Trademark Office*